United States Patent [19]
Chun

[11] Patent Number: 5,416,759
[45] Date of Patent: May 16, 1995

[54] VARIABLE GAIN DIGITAL SERVO SYSTEM WITH IMPROVED RESOLUTION AND REDUCED QUANTIZATION ERROR

[75] Inventor: Hwan S. Chun, Tokyo, Japan

[73] Assignee: Samsung Electronics Co., Ltd., Kyungi-do, Rep. of Korea

[21] Appl. No.: 181,051

[22] Filed: Jan. 14, 1994

[30] Foreign Application Priority Data

May 2, 1993 [JP] Japan .................................. 5-018535

[51] Int. Cl.⁶ ............................................. G11B 7/00
[52] U.S. Cl. ............................ 369/44.36; 369/44.29; 369/44.34
[58] Field of Search ............... 369/44.11, 44.25, 44.29, 369/124, 44.34, 44.35, 44.36, 112

[56] References Cited

U.S. PATENT DOCUMENTS 5,109,367 4/1992 Yoshikawa ..................... 369/44.36

FOREIGN PATENT DOCUMENTS 3-269829 12/1991 Japan ................................. 369/44.36

Primary Examiner—Georgia Y. Epps
Assistant Examiner—Nabil Hindi
Attorney, Agent, or Firm—Robert A. Westerlund; Stephen R. Whitt; Charles R. Donohoe

[57] ABSTRACT

A digital servo system for servo controlling a prescribed function of a host device, e.g., the tracking servo function of an optical disk drive. The digital servo system includes a variable gain amplifier for amplifying an analog error signal issued by the host device, an A/D converter for converting the analog error signal to a digital error signal, an adder for adding a wobbling signal to the digital error signal to produce a composite digital error signal, digital signal processing circuitry for processing the composite digital error signal to produce a processed digital error signal, a D/A converter for converting the processed digital error signal to an analog servo control signal to be used in servo controlling the prescribed function of the host computer. The digital servo system further includes a locking state detection circuit for detecting whether the composite digital error signal is in a locking or pre-locking state, a loop gain detection circuit for detecting the loop gain of the servo system, and a gain controller responsive to the outputs of the locking state detection circuit and the loop gain detection circuit for adjusting the reference voltage applied to the A/D converter and for adjusting the gain of the variable gain amplifier in such a manner as to maximize the dynamic range of the digital servo system.

20 Claims, 6 Drawing Sheets

ERROR SIGNAL

LOCKING SIGNAL

WOBBLING SIGNAL

ERROR SIGNAL

LOCKING SIGNAL

GAIN DETECTING

GAIN CONTROL

VARIABLE GAIN DIGITAL SERVO SYSTEM WITH IMPROVED RESOLUTION AND REDUCED QUANTIZATION ERROR

FIELD OF THE INVENTION

The present invention relates generally to a digital servo system, e.g., for use in an optical disk drive, and more particularly, to a digital servo system with improved dynamic range.

BACKGROUND OF THE INVENTION

A conventional servo system employed in an optical disk drive is disclosed in Japanese patent publication No. 49531/1992, and depicted in FIG. 1. With reference to FIG. 1, the conventional servo system includes an optical peak amplifier 1, a gain controlled amplifier 2 having a gain G1, an A/D converter 3, an adder 4 for adding a wobbling signal to the output of the A/D converter 3, a multiplier 5, an equalizer 6, a D/A converter 7, a driving signal amplifier 8, a gain controller 9, and a loop gain detecting circuit 10. In an optical disk drive (not shown) of which the conventional servo system is a part, a laser beam emitted from a laser diode (not shown) is reflected from a reflective surface of an optical disk (not shown) and the reflected laser beam is detected by a photodetector (not shown). An error signal generating circuit (not shown) processes the output of the photodetector to generate an error signal. The gain controlled amplifier 2 amplifies the error signal with the gain G1. The A/D converter 3 quantizes the analog signal output of the gain controlled amplifier 2 into an N-bit digital signal. The adder 4 adds the wobbling signal (which is used for controlling loop gain) to the output of the A/D converter 3. The multiplier 5 multiplies the output of the adder 4 by a gain G2 which is adjusted by the loop gain detecting circuit 10 in such a manner as to cause the loop gain to become "1" at a gain cross point frequency. The equalizer 6 includes filters to suppress noise and minimize steady-state deviation of the error signal. The digital signal output of the equalizer 6 is converted to an analog signal by the D/A converter 7 and then applied to an actuator of the optical peak amplifier 1 via the driving signal amplifier 8, so as to drive an objective lens (not shown) in the proper direction to cause the error signal to become zero, i.e., so as to correct the position of the objective lens and thereby eliminate the error.

In general, the reflectivity of optical disks varies or deviates from a prescribed standard. Thus, the gain of the servo system must be adjusted to compensate for these reflectivity deviations. To this end, the wobbling signal is applied to the loop circuit of the servo system to add a "wobble" component to the output of the optical peak amplifier 1. The loop gain detecting circuit 10 monitors the "wobble" component of the output of the optical peak amplifier 1 in order to detect gain deviations. The gain controller 9, in response to the detected gain deviations, makes the necessary adjustments to the gain G1 of the gain controlled amplifier 2, to thereby remove the deviations in the output of the optical peak amplifier 1 which are due to reflectivity deviations of the optical disk.

FIG. 2 illustrates the change of the error signal upon application of the wobbling signal to the loop circuit. More particularly, it can be seen in FIG. 2 that the error signal varies greatly at the time the wobbling signal is applied to the loop circuit, and thereafter, is gradually damped down. The gain G1 of the gain controlled amplifier 2 is determined during the interval between time t1 and time t2. The "locking state" of the servo system occurs when the error signal is damped down sufficiently for the servo system to be considered stabilized.

With reference now to both FIGS. 1 and 2, it can be seen that the A/D converter 3 of the conventional servo system described above has a fixed (8-bit) resolution. Thus, if the error signal detected during the interval between time t1 and time t2 has an amplitude of 4 volts, the resolution of the A/D converter 3 is $4/(2^8) = 4/256$ volts.

In operation, after the locking state is detected, the optical disk drive reads data from the optical disk. During normal operation, the error signal (e.g., tracking error signal) has a peak-to-peak amplitude of several hundred millivolts. Therefore, if one resolution step of the A/D converter 3 is set at 4/256 volts as described above, then the digital error signal produced by the A/D converter 3 during normal operation is of relatively low resolution. Obviously, it is desirable to increase the resolution of the A/D converter during normal operation (i.e., after the locking state has been detected) in order to provide a higher resolution digital error signal. However, the cost of improving the resolution of the A/D converter in the conventional manner, i.e., by increasing the number of bits used, is unduly high.

Based on the above, it can be appreciated that there presently exists a need for a digital servo system which eliminates the above-described drawbacks and shortcomings of the presently available digital servo systems. The present invention fulfills this need.

SUMMARY OF THE INVENTION

The present invention encompasses a digital servo system for servo controlling a prescribed function of a host device, e.g., the tracking servo function of an optical disk drive. The digital servo system includes a variable gain amplifier for amplifying an analog error signal issued by the host device, an A/D converter for converting the analog error signal to a digital error signal, an adder for adding a wobbling signal to the digital error signal to produce a composite digital error signal, digital signal processing circuitry for processing the composite digital error signal to produce a processed digital error signal, a D/A converter for converting the processed digital error signal to an analog servo control signal to be used in servo controlling the prescribed function of the host computer. The digital servo system further includes a locking state detection circuit for detecting whether the composite digital error signal is in a locking or pre-locking state, a loop gain detection circuit for detecting the loop gain of the servo system, and a gain controller responsive to the outputs of the locking state detection circuit and the loop gain detection circuit for adjusting the reference voltage applied to the A/D converter and for adjusting the gain of the variable gain amplifier in such a manner as to maximize the dynamic range of the digital servo system.

BRIEF DESCRIPTION OF THE DRAWINGS

These and various other features and advantages of the present invention will be readily understood with reference to the following detailed description taken in conjunction with the accompanying drawings, wherein like reference numerals designate like structural elements, and, in which.

DETAILED DESCRIPTION OF THE INVENTION

Figure 1:
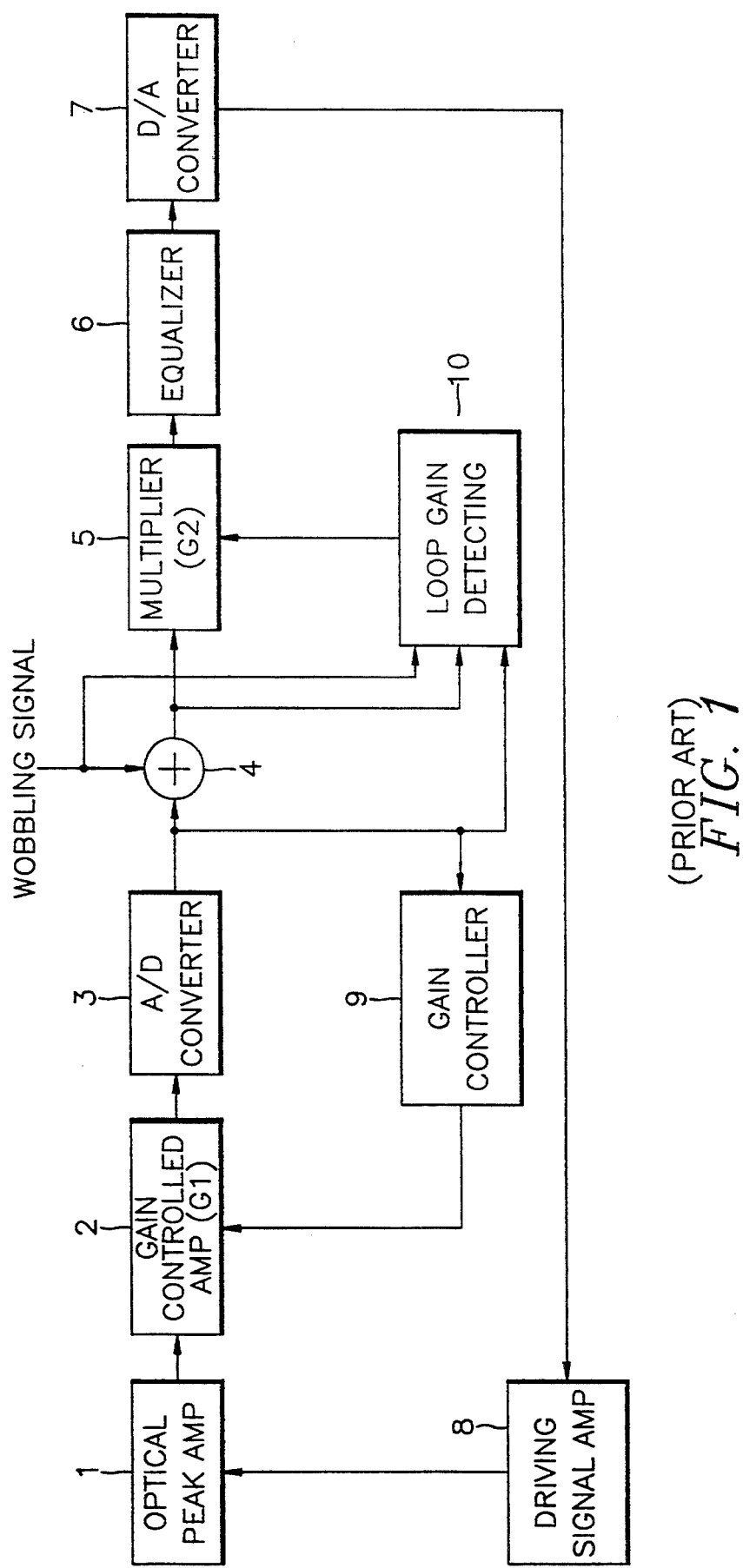
FIG. 1 is a functional block diagram of a conventional digital servo system.
Figure 2A:
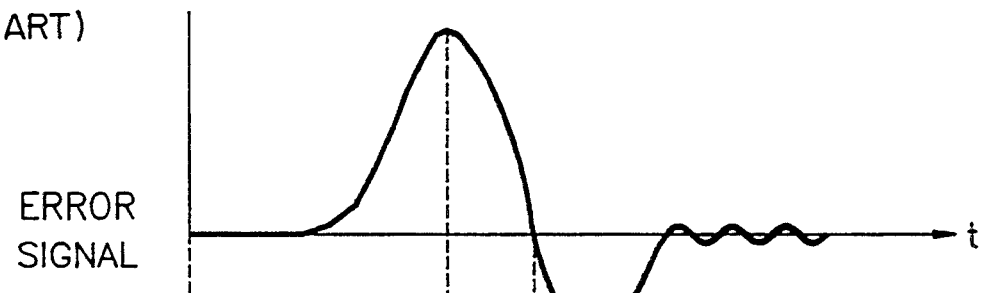
FIG. 2 is a timing diagram showing the relationship between the error and locking signals produced by the digitial servo system depicted in FIG. 1.
Figure 2B:
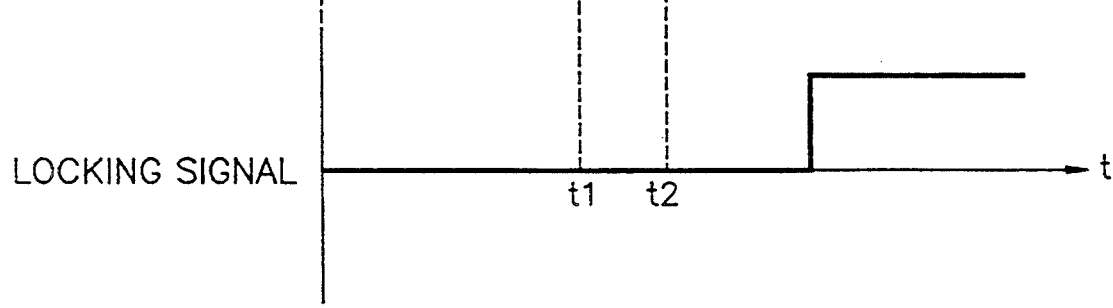
Figure 3:
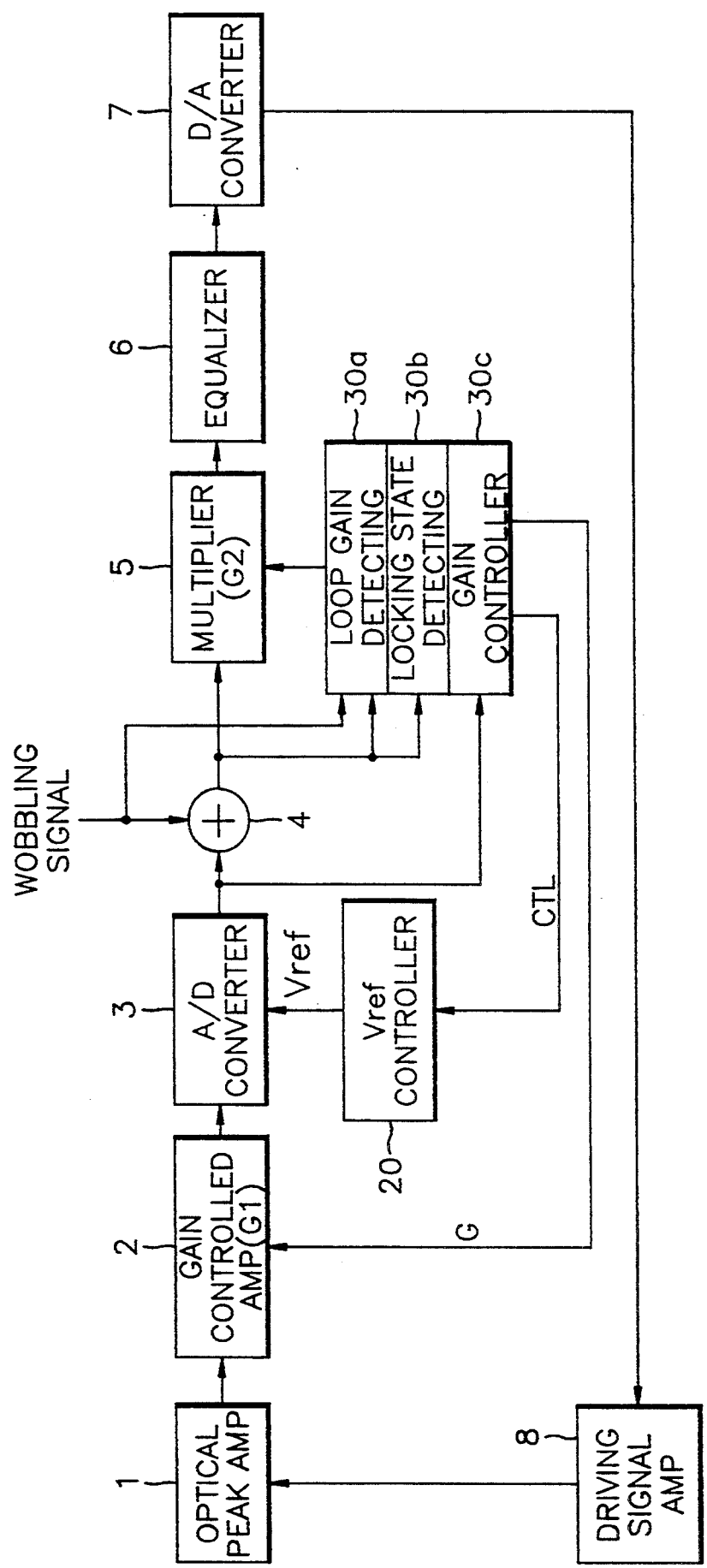
FIG. 3 is a functional block diagram of a digital servo system constructed in accordance with a preferred embodiment of the present invention.

With reference now to FIG. 3, there can be seen a digital servo system constructed in accordance with a preferred embodiment of the present invention, which system can be used as a tracking servo system, focus servo system, or spindle servo system of an optical disk drive. As can be seen in FIG. 3, the digital servo system of the preferred embodiment of the present invention includes an optical peak amp 1, a gain controlled amp 2, an A/D converter 3, an adder 4, a multiplier 5 having a gain G2, an equalizer 6, a D/A converter 7, a driving signal amp 8, a reference voltage (Vref) controller 20, a loop gain detecting circuit 30a, a locking state detector circuit 30b, and a gain controller 30c, the function and interrelationship of which are described below.

Figure 4:
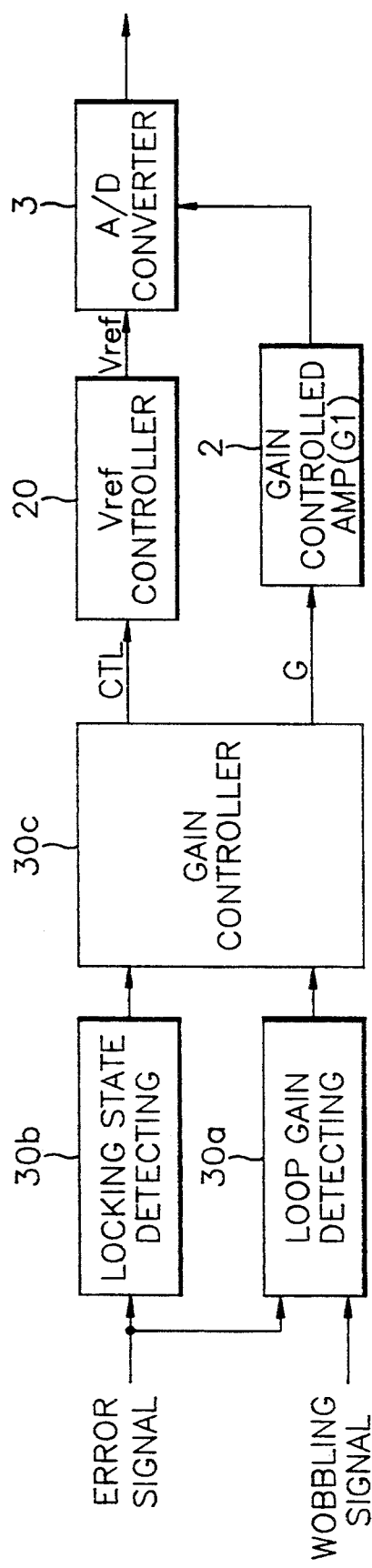
FIG. 4 is a block diagram depicting a portion of the digital servo system depicted in FIG. 3 in greater detail.
Figure 5A:
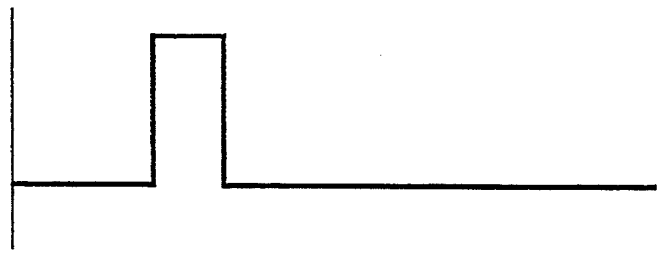
FIG. 5 is a timing diagram showing the relationship between various signals produced by the digital servo system depicted in FIG. 3; and, FIG. 6 is a schematic diagram of a preferred embodiment of the reference voltage controller of the digtial servo system depicted in FIG. 3.
Figure 5B:
Figure 5C:
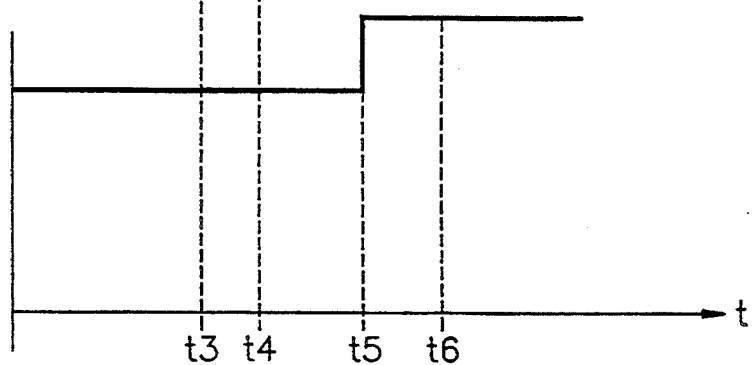
Figure 5D:
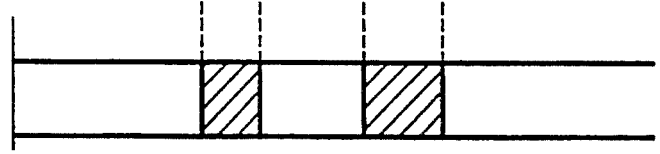
Figure 5E:
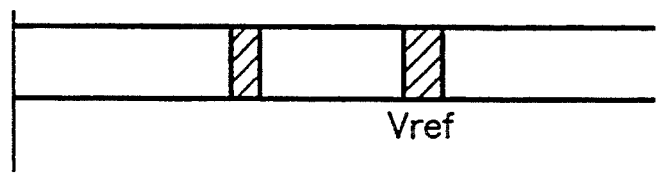

With reference now to FIG. 4, there can be seen the feedback control circuitry of the servo system loop, which functions to provide feedback control of the A/D converter 3 by adjusting the gain G1 of the gain controlled amplifier 2 and adjusting the level of the reference voltage Vref, in such a manner as to minimize the quantization error of the A/D converter 3. More particularly, the gain controller 30c generates a reference voltage control signal CTL which is applied to the reference voltage controller 20, to thereby adjustably control the level of the reference voltage Vref, and also generates a gain control signal G which is applied to the gain controlled amplifier 2, to thereby adjustably control the gain thereof.

With reference now to FIG. 5, it can be seen that when the wobbling signal is applied to the servo loop, the peak-to-peak error signal is abruptly and dramatically increased. After the wobbling signal is applied, and specifically during the interval between time t3 and time t4, the loop gain detecting circuit 30a detects the difference between the level of the signal output by the adder 4, i.e., the wobbling signal+the error signal output by the A/D converter 3, and the level of the wobbling signal itself. During this interval between time t3 and time t4, the gain controller 30c is responsive to the output of the loop gain detecting circuit 30a, so that the gain control signal G output by the gain controller 30c during this time interval serves to coarsely control the gain G1 of the gain controlled amplifier 2, to thereby stabilize the operation of the servo loop, and thereby damp the error signal. After the locking state detector circuit 30b detects the locking state (i.e., when it detects that the wobbling+error signal output by the adder 4 has reached some prescribed near-zero value), and specifically, during the interval between time t5 and time t6, the gain controller 30c is responsive to the error signal output-by the A/D converter 3, so that the gain control signal G output by the gain controller 30c during this time interval serves to finely control the gain G1 of the gain controlled amplifier to an optimal level. In the locking state, the level of the error signal is close to 0 volts. In an exemplary embodiment of the present invention, in order to provide an adequate safety margin, the prescribed peak-to-peak error signal is set higher than the observed peak-to-peak error signal. For example, if the observed peak-to-peak error signal is 0.15 Vpp in the locking state, then the prescribed peak-to-peak error signal is set to 0.20V, and the reference voltage Vref is controllably adjusted by the Vref controller 20, in response to the reference voltage control signal CTL also output by the gain controller 30c, to a level which causes the 8-bit A/D converter 3 to generate an output of "11111111".

Figure 6:
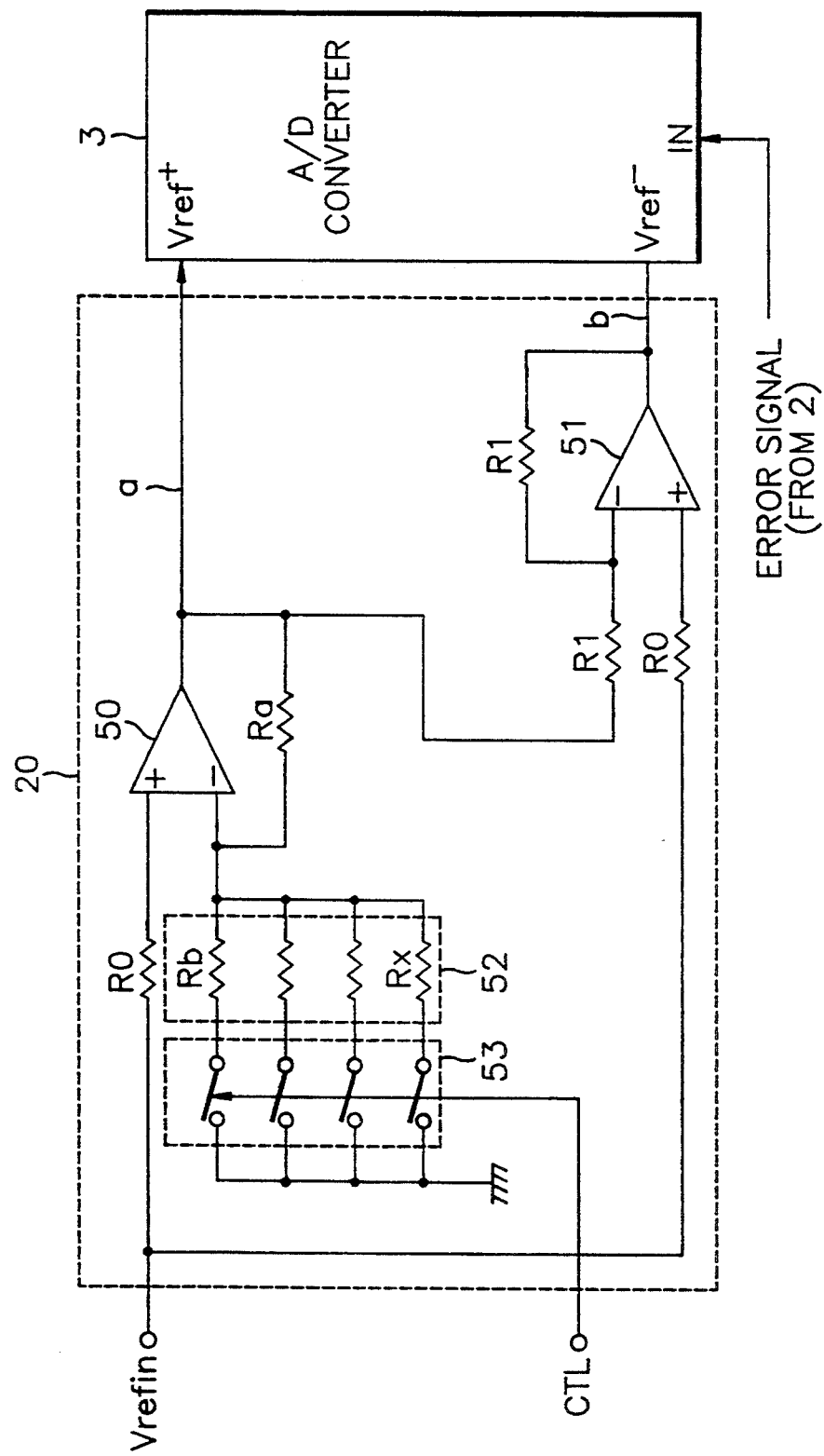

With reference now to FIG. 6, there can be seen a preferred embodiment of the reference voltage controller 20. The reference voltage controller 20 includes two operational amplifiers 50 and 51, a plurality of resistors 52, and a plurality of switches 53, which are preferably analog switches. The operational amplifier 51 inverts the output of the operational amplifier 50 with unitary gain. Accordingly, the voltage levels at the Vref+ and Vref− terminals of the A/D converter 3 are changed by the same absolute amount, regardless of variations in the input reference voltage Vrefin.

In operation, one of the resistors 52, e.g., the resistor Rx, is selected by the switches 53 in accordance with the reference voltage control signal CTL. For example, if Ra=12K, Rx=20K, R1=20K, R0=10K, and the reference voltage input Vrefin=2.5V, then the voltage on line "a" becomes 4 volts (=2.5 +2.5 Ra/Rx) and the voltage on line "b" becomes 1 volt (=2.5+(2.5−4)R1/R1). Thus, the error signal is converted by the A/D converter 3 into a digital error signal of 256 steps within a range between 4 volts to 1 volt, centering around 2.5 volts. In this regard, it should be appreciated that during the time interval between time t3 and t4, when the wobbling signal is applied and before a locking state is detected, the reference voltage control signal CTL will select a resistor, e.g., the resistor Rx, which results in a higher reference voltage Vref being applied to the A/D converter 3, because the peak-to-peak voltage Vpp of the error signal during this time is relatively high (e.g., 3 volts), thereby resulting in an A/D converter step resolution of 3/256.

However, with the present invention, after the locking state is detected and the peak-to-peak voltage Vpp of the error signal is much lower (e.g., 1 volt), the reference voltage control signal CTL will select a resistor, e.g., resistor Rb, which results in a lower reference voltage Vref being applied to the A/D converter 3, thereby resulting in an A/D converter step resolution of 1/256.

In this way, the present invention enables the A/D converter 3 to have a maximum resolution and minimum quantization error during both the locking state and the pre-locking state. Thus, the dynamic range of the digital servo system is significantly enhanced, thereby improving the accuracy, stability, and reliability of the servo system relative to presently available digital servo systems.

In addition to the above, it should be appreciated that the reference voltage controller 20 of the present invention provides another significant advantage over the presently available digital servo systems. Namely, with the presently available systems, the reference voltage applied to the A/D converter is subject to significant variations due to fluctuations in the supply voltage Vdd (not shown) to the optical disk drive (not shown), thereby increasing the quantization error of the A/D converter 3. However, with the present invention, because the voltage levels at the Vref+ and Vref− terminals are complementarily changed in response to fluctuations of the input reference voltage Vrefin, the quantization error of the A/D converter 3 is drastically reduced.

Although the present invention has been described hereinabove in connection with a digital servo system for use in an optical disk drive, it should be recognized that the digital servo system of the present invention can be used in any other suitable application, e.g., in a data signal processing device.

Based upon the above and foregoing, it should be appreciated that with the system of the present invention, even after the locking state is detected, the gain of the gain controlled amplifier 2 is not changed, but rather, only the reference voltage Vref is changed. This is because if the gain G1 of the gain controlled amplifier 2 is adjusted in addition to adjusting the reference voltage Vref, this may cause the equalizer 6 to adversely affect the operation of the actuator (not shown) of the optical peak amp 1. However, in accordance with an alternative embodiment of the present invention, the gain G1 of the gain controlled amplifier 2 can also be adjusted in addition to the adjustment of the reference voltage Vref, as long as the gain G1 of the gain controlled amplifier 2 is kept within a range which does not adversely affect the operation of the equalizer 6.

Further, based upon the above and foregoing, it can be appreciated that with the digital servo system of the present invention, the subloop gain and the resolution of the A/D converter 3 are established after detecting the locking state, so that the quantization error of the A/D converter 3 is drastically reduced.

Although the present invention has been described hereinabove in connection with a specific, preferred embodiment thereof, it should be clearly understood that many variations and/or modifications of the basic inventive concepts herein taught which may appear to those skilled in the art will still fall within the spirit and scope of the present invention as defined in the appended claims.

What is claimed is:

1. A digital servo system for servo controlling a prescribed function of a host device, comprising:
    an amplifier for amplifying an analog error signal issued by the host device, said amplifier having an adjustable gain;
    an A/D converter for converting said analog error signal into a digital error signal;
    an adder for adding a wobbling signal to said digital error signal, to thereby produce a composite digital error signal;
    means for processing said composite digital error signal to produce a processed digital error signal;
    a D/A converter for converting said processed digital error signal into an analog servo control signal; and,
    means for applying an adjustable reference voltage to said A/D converter;
    means responsive to said digital error signal, said wobbling signal, and said composite digital error signal for adjusting said reference voltage applied to said A/D converter and for adjusting said gain of said amplifier.

2. The system as set forth in claim 1, wherein said processing means includes:
    a multiplier for multiplying said composite digital error signal by a prescribed gain to thereby produce a multiplied composite digital error signal; and,
    an equalizer for equalizing said multiplied composite digital error signal to thereby produce said processed digital error signal.

3. The system as set forth in claim 1, wherein said means for adjusting said reference voltage and for adjusting said gain includes a locking state detection circuit for detecting when said composite digital error signal is in a first state wherein its value is above a prescribed value and when said composite digital error signal is in a second state wherein its value is below said prescribed value, and for generating a locking state signal having a value indicative of which of said first or said second states has been detected.

4. The system as set forth in claim 3, wherein said means for adjusting said reference voltage and for adjusting said gain further includes a loop gain detection circuit responsive to said wobbling signal and to said composite digital error signal for detecting the gain of said digital servo system and for outputting a loop gain signal having a value indicative of said detected gain.

5. The system as set forth in claim 4, wherein said means for adjusting said reference voltage and for adjusting said gain further includes a gain controller circuit responsive to said loop gain signal and said locking state signal for generating a reference voltage control signal for adjusting said reference voltage applied to said A/D converter and for generating a gain control signal for adjusting said gain of said amplifier.

6. The system as set forth in claim 5, wherein the value of said reference voltage control signal varies dependent upon the value of said locking state signal.

7. The system as set forth in claim 6, wherein the value of said gain control signal varies depending on the value of said loop gain signal.

8. The system as set forth in claim 7, wherein said means for applying an adjustable reference voltage includes:
    a first operational amplifier having a first input terminal and a second input terminal, and producing a first amp output signal indicative of the difference between signals applied to said first and second input terminals thereof;
    a second operational amplifier having a first input terminal and a second input terminal, and producing a second amp output signal indicative of the difference between signals applied to said first and second input terminals thereof;
    wherein an input reference voltage signal is applied to said first input terminal of said first operational amplifier and said reference voltage control signal is applied to said second input terminal of said first operational amplifier;
    wherein said first amp output signal is applied to said second input terminal of said second operational amplifier and said reference voltage control signal is applied to said first input terminal of said second operational amplifier;

wherein said A/D converter includes a reference voltage input terminal of a first polarity and a reference voltage input terminal of a second polarity opposite that of said first polarity; and, wherein said first amp output signal is applied to said reference voltage input terminal of said first polarity and said second amp output signal is applied to said reference voltage input terminal of said second polarity.

9. The system as set forth in claim 8, wherein said means for applying an adjustable reference voltage further includes:

a plurality of resistors connected to said second input terminal of said first operational amplifier, each of said resistors having a different value;

a plurality of switches coupled between respective ones of said plurality of resistors and a reference voltage terminal; and, wherein a selected one of said switches is closed in response to said reference voltage control signal, to thereby electrically couple a respective one of said resistors to said second input terminal of said first operational amplifier.

10. The system as set forth in claim 9, wherein said first amp output signal is coupled to said second input terminal of said first operational amplifier through a first feedback resistor and said second amp output signal is coupled to said second input terminal of said second operational amplifier through a second feedback resistor.

11. The system as set forth in claim 10, wherein said input reference voltage signal is applied to said first input terminal of said first operational amplifier through a first amp input resistor, said reference voltage control signal is applied to said first input terminal of said second operational amplifier through a second amp first input resistor, and said first amp output signal is applied to said second input terminal of said second operational amplifier through a second amp second input resistor.

12. The system as set forth in claim 11, wherein the value of said second feedback resistor is equal to the value of said second amp second input resistor.

13. The system as set forth in claim 12, wherein the value of said first amp input resistor is equal to the value of said second amp first input resistor.

14. The system as set forth in claim 13, wherein said first input terminal of both said first operational amplifier and said second operational amplifier is a non-inverting input terminal and said second input terminal of both said first operational amplifier and said second operational amplifier is an inverting input terminal.

15. The system as set forth in claim 14, wherein said first polarity is positive and said second polarity is negative.

16. The system as set forth in claim 7, wherein said means for applying an adjustable reference voltage is responsive to said reference voltage control signal during a first period of time when said first state has been detected for applying a reference voltage of a first value to said A/D converter, and responsive to said reference voltage control signal during a second period of time when said second state has been detected for applying a reference voltage of a second value to said A/D converter.

17. The system as set forth in claim 16, wherein said first value is higher than said second value.

18. The system as set forth in claim 1, wherein said host device is an optical disk drive.

19. The system as set forth in claim 15, wherein said host device is an optical disk drive.

20. The system as set forth in claim 5, wherein said means for adjusting said reference voltage and for adjusting said gain is responsive to said locking state signal for generating said gain control signal only during a period of time when said second state has been detected.

* * * * *